March 3, 1959 H. BOUCKE ET AL 2,875,750
MEANS FOR BLOOD PRESSURE DETERMINATION
Filed Aug. 10, 1955 4 Sheets-Sheet 1
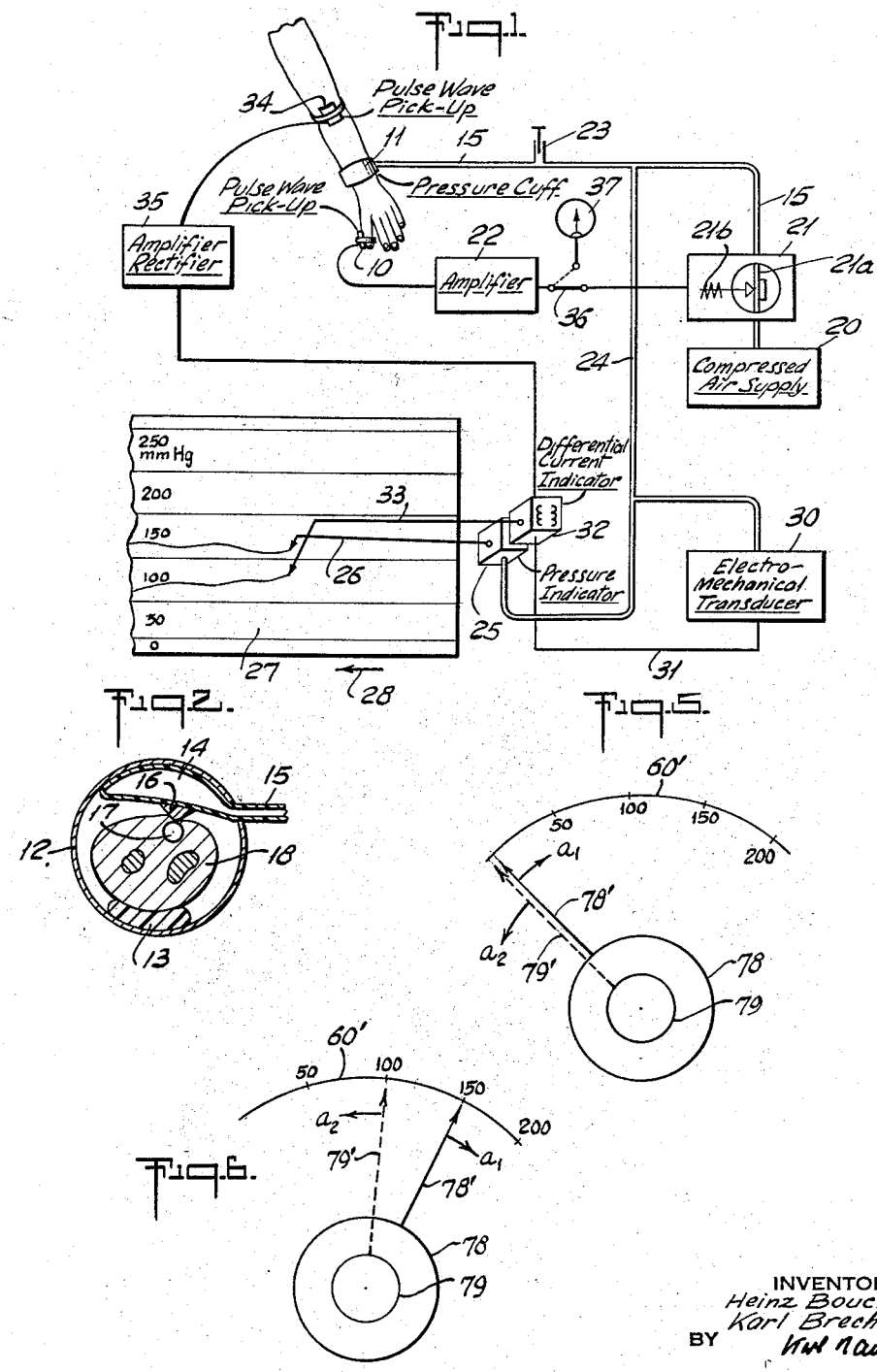
INVENTORS
Heinz Boucke
Karl Brecht
BY
ATTORNEY

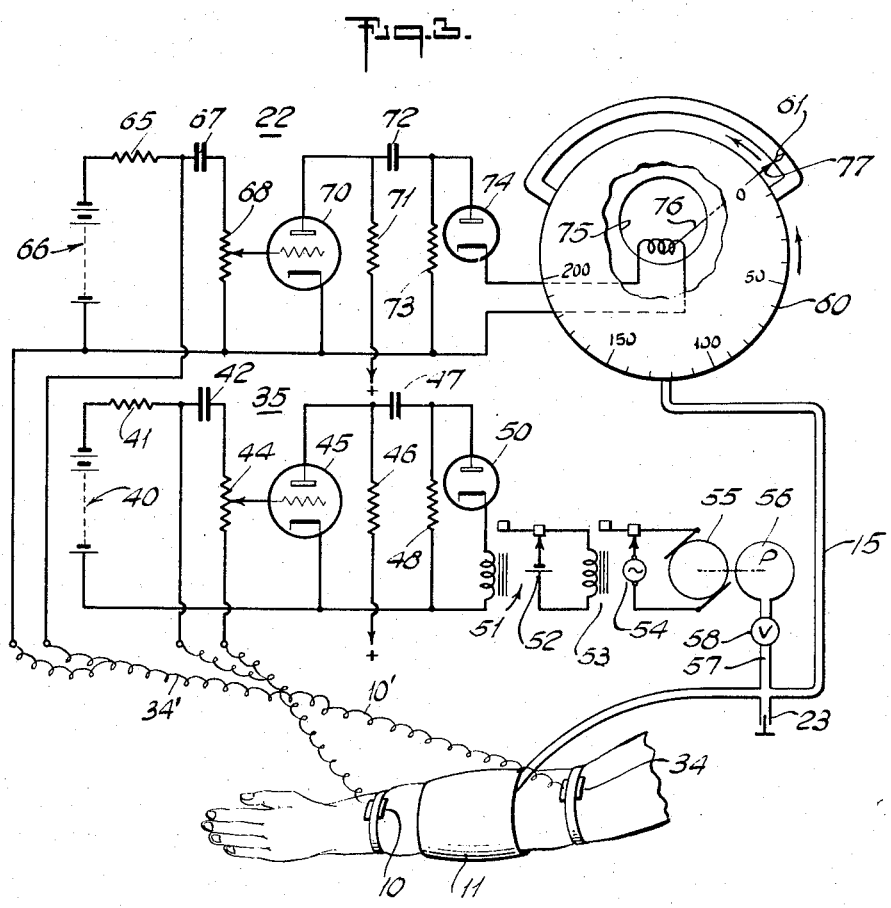
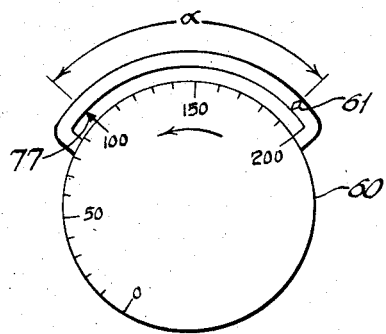

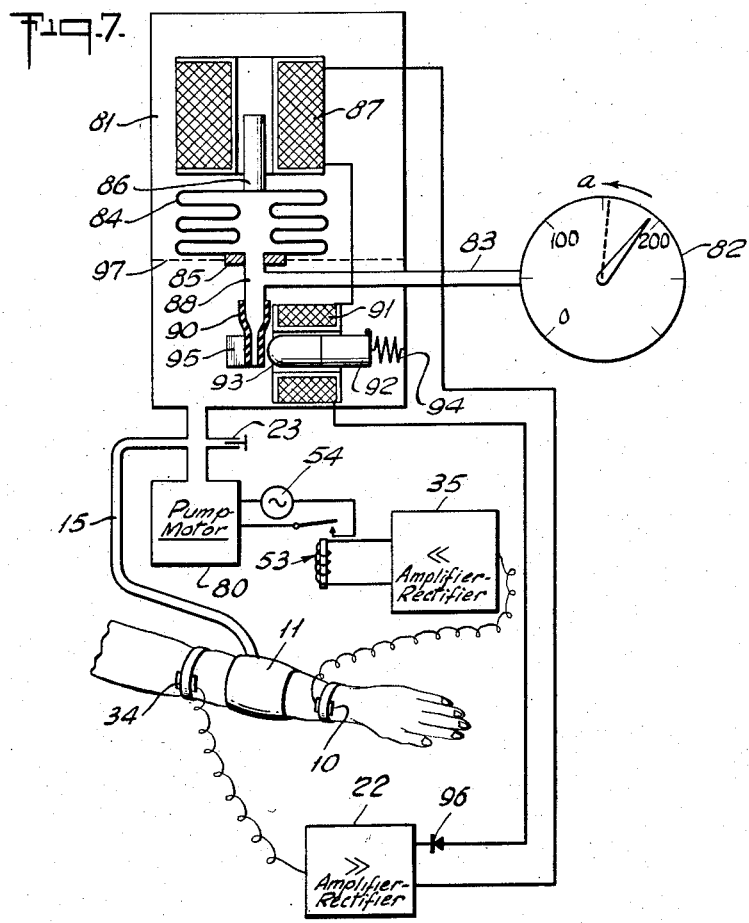
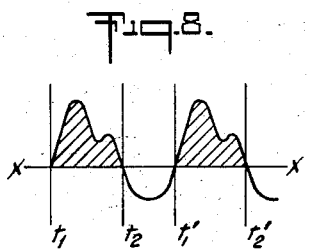
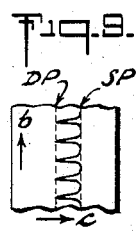

March 3, 1959 H. BOUCKE ET AL 2,875,750
MEANS FOR BLOOD PRESSURE DETERMINATION
Filed Aug. 10, 1955 4 Sheets-Sheet 4

INVENTORS
Heinz Boucke
Karl Brecht
BY
ATTORNEY ated Mar. 3, 1959

2,875,750

MEANS FOR BLOOD PRESSURE DETERMINATION

Heinz Boucke and Karl Brecht, Tubingen, Germany, assignors to Radio Patents Company, a partnership of New York Application August 10, 1955, Serial No. 527,607

6 Claims. (Cl. 128—2.05)

This application is a continuation-in-part of our copending application Serial No. 383,646, filed October 1, 1953, entitled, Means For and Method Of Indicating and/or Recording Blood Pressure, now abandoned.

The present invention relates to means for and a method of continuously indicating and/or recording both the systolic and diastolic blood pressure of the human or animal organism.

Among the objects of the invention is the provision of an improved method and arrangement of this type which is both simple in construction and easy to use; which will enable a continuous direct indication and/or recording of both the systolic blood pressure or highest pressure in the arteries during contraction of the heart muscle, as well as of the diastolic pressure or lowest pressure in the arteries during relaxation of the heart muscle within a heartbeat cycle; and which utilizes relatively simple instrumentalities and devices substantially without the danger of injury or discomfort to the patient.

The above and related objects as well as novel aspects of the invention will be better understood from the following detailed description taken in reference to the accompanying drawing, forming part of this specification and wherein:

Fig. 1 is a schematic block diagram of a blood pressure determination system constructed in accordance with the principles of the invention for continuous measurement of both the systolic and diastolic blood pressure;

Fig. 2 shows a preferred device for effecting arterial occlusion in connection with the invention;

Fig. 3 is a diagram showing a modification of a continuous blood pressure recorder and/or indicator according to the invention;

Fig. 4 is a partial view explanatory of the function of the indicator of Fig. 3;

Figs. 5 and 6 are schematic diagrams illustrating an alternative construction of an indicator according to Fig. 3;

Fig. 7 is a diagram showing still another modification of a blood pressure recorder and/or indicator embodying the invention;

Figs. 8 and 9 are curves illustrative of the function and operation of Fig. 7.

Like reference characters denote like parts throughout the different views of the drawings.

Figure 10:
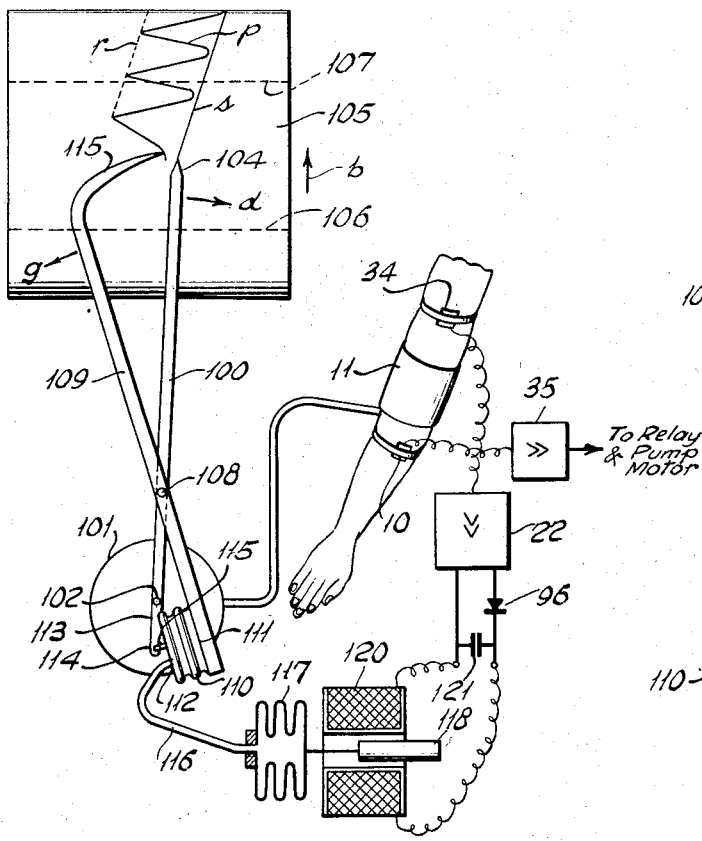
Figs. 10 and 11 are front and side views of yet another construction of a blood pressure recorder according to the invention.

With the above and further objects in view, as will appear hereafter, the invention is predicated principally on the concept that the pulse beat or amplitude represents essentially the intra-arterial fluctuations between the systolic and diastolic blood pressure values. This makes it possible, by a suitable combination with either values, that is, of either systolic or diastolic pressure with the pulse amplitude, derived in any suitable manner, to compute the other pressure by the aid of a suitable combining means, such as a differential or summation device or indicator. More particularly, if the automatic compensating system indicates the systolic pressure, the diastolic pressure is obtained by subtractively or differentially combining the systolic value with the pulse amplitude to produce an indication representing the diastolic blood pressure. Alternatively, if the automatic compensating system is designed to record the diastolic blood pressure, the systolic value is obtained by additively combining the diastolic pressure with the pulse amplitude by means of a suitable summation or combining device, in the manner more clearly described and understood from the specific examples and embodiments described hereinafter and shown in the drawings. According to an improved feature of the invention, the indicating or recording device for the systolic and diastolic pressures are combined structurally and/or arranged spatially relative to one another, to enable a simultaneous reading and/or comparison of the respective pressures by a single indication or observation.

Referring more particularly to Figs. 1 and 2, the numeral 10 indicates a pulse wave pickup device applied to a limb or peripheral point, such as the patient's thumb and located below or distally in respect to a pneumatic pressure cuff 11 applied to the wrist or the radial artery in the example illustrated. The pickup 10 responsive to the arterial or tissue volume changes caused by the heartbeats, may be of any suitable type known in the art, such as a piezoelectric pickup or preferably in the form of an electrostatic pressure transducer in the form of an elastic or loosely wound capacitor, as described in United States application Serial No. 277,817 entitled Electrostatic Transducer, filed March 21, 1952, now Patent No. 2,755,796, by Heinz Boucke, joint applicant of the present application. The pickup 10 converts the volume changes caused by the arterial or venous pulse into corresponding changes of electrical potential variation, while the cuff serves to control or occlude the blood supply to the pickup point. Alternatively, the pickup 10, supported by a strap or bandage, may be applied to the lower arm or cubital artery, while the cuff 11 is applied to the upper arm or brachial artery, as shown in Figs. 3, 7 and 10.

According to a preferred construction shown by Fig. 2, the cuff 11 is designed for arterial rather than venous occlusion of the blood supply to the pickup 10, to avoid discomfort for the patient and for this purpose comprises a wristband or strap 12 of metal or the like and provided at diametrically opposed points of its inner surface with a leather or rubber cushion 13, on the one hand, and an elastic pressure bag of rubber or an equivalent material. The bag 14 is connected through a tube 15 with a source of compressed air, such as a pressure tank 20, Fig. 1, whereby to inflate the bag 14 and to cause a projection or knob 16 thereof to press against the artery 17 being flush with the arm 18. By a device of this type, a complete venous constriction of the arm 18 is avoided, thus enabling a continuous blood pressure indication or recording during extended time periods substantially without discomfort or injury to the patient.

Interposed between the tank 20 and tubing 15 is an electrically actuatable control valve 21 energized by the output current of a power amplifier 22 which has its input connected to the pickup 10. The valve 21 may be of any suitable construction, such as in the form of a rubber tube 21a actuated by the armature or plunger of a solenoid winding 21b excited by the output current of the amplifier 22.

In an arrangement of this type, assuming the initial air pressure in the tubing 15 and occluding cuff or bag 14 to be adjusted to a value equal to the systolic blood pressure in the artery 17, that is, with the artery being fully occluded and the blood supply to the pickup being interrupted, and assuming further that the current controlling the valve 21 has a proper amplitude and direction, an increase of the systolic blood pressure will result in a series of pulse waves passing the cuff 11 and being recorded by the pickup 10, whereby to cause an opening of the valve 21 and, in turn, an increase of the air pressure in the chamber 14 to such an extent as to rebalance the systolic blood pressure. The higher the response sensitivity of the valve 21, the smaller will be the differential between the air pressure in the cuff or bag 14 and the systolic blood pressure in the artery 17. This differential between the two pressures may be taken into consideration in the calibration of the device.

In order to enable the system to follow or respond to decreasing systolic blood pressure, tubing 15 is provided with an escape nozzle 23 of predetermined opening or cross-section. Upon setting the device into operation, pressure in the bag or cuff 16 increases, as a result of the operation of the valve 21, until the pulse waves disappear in the pickup 10, that is, when the pneumatic pressure equals the systolic pressure, thus interrupting the operation of the valve 21. Since, however, air is constantly escaping through the nozzle 23, the pulses soon reappear, causing the valve 21 to operate and resulting in renewed increase of the cuff pressure in the bag 14 and, in turn, interruption of the pulsations. This operation continues periodically in such a manner that the pressure in the bag 14 fluctuates continuously about the average systolic blood pressure in the artery. If, now, the systolic pressure in the artery increases, the pulse amplitude of the pickup 10 increases, resulting in a greater opening of the valve 21 and increased cuff pressure to balance the systolic pressure. On the other hand, if the systolic pressure in the artery decreases, this will result in a reduction or disappearance of the pulse amplitude in the pickup 10 and, in turn, a closing of the valve 21 to allow of sufficient air to escape through nozzle 23 so as to again effect a balance between the cuff and the systolic pressure, in a manner readily understood. In other words, the effect of the escape nozzle 23 is to cause the pneumatic or compensating pressure in the cuff or bag 14 to follow both the increasing and decreasing systolic pressure variations. The time constants of the entire system may advantageously be so chosen to include the fluctuations caused by the breathing or respiratory movement of the patient with indication or registration of the blood pressure.

The tubing 15 is further connected through a line 24 with the pressure box or chamber 25 of a pneumatic pressure gauge or indicator having a pointer or recording stylus 26. As a result, the latter will be deflected from its zero position in such a manner as to enable a continuous indication and/or recording of the systolic pressure upon a strip chart 27 moved at a constant speed in the direction of the arrow 28. The chart may be calibrated in pressure values such as in mm./Hg (millimeters of mercury), as indicated in the drawing.

In order to simultaneously indicate the diastolic blood pressure there is provided, according to the present invention, an electromechanical transducer or converter 30 of any suitable type known and connected to the tube or line 24, to convert the pneumatic pressure corresponding to the systolic blood pressure into proportionate variations of an electric current. The converter 30 may, for instance, be a piezoelectric transducer, a capacitative transducer according to the above-mentioned patent, or it may consist simply of a resistance wire associated with the mercury column of an ordinary pressure gauge, in such a manner as to cause increasing portions or turns of said wire to be short-circuited by the mercury column in proportion to the applied input pressure. The resistance is connected in a circuit including a constant potential source, such as a battery, whereby the resultant output voltage varies proportionately to the pressure changes.

The output current of the transducer 30 varying in proportion to the systolic blood pressure is applied through an electric conductor 31 to a further electrical indicator or recorder 32 which may take the form of a moving coil instrument having an indicating needle or recording pen 33. The energizing current for this indicator or recorder supplied by the transducer 30 is so adjusted, both as to its magnitude and polarity, that the pointer or pen 33 will be deflected equally to the pen 26 and in proportion to the systolic blood pressure, assuming that no further current is applied to the instrument 32. According to the invention, the latter is designed to be responsive to the differential between two currents and, for this purpose, may have a moving coil comprising a pair of exciting windings energized or connected in opposed relation, in such a manner as to impose an opposite torque on the movable system of the instrument.

As pointed out, one of the currents energizing the instrument 32 is supplied by the output of the transducer 30 in the manner described, while the exciting current for the other differentially connected winding is supplied by a further pulse wave pickup device 34 arranged proximally or on the side of the heart in respect to the cuff or bag 14 so as to be subject to the full arterial volume changes or blood pressure fluctuations of the patient independently of the occlusion of the artery. The current pulses produced by the pickup 34 which may be of a similar construction to the pickup 10, are passed through an amplifier-rectifier 35 to produce a unidirectional output current proportional to the average pulse amplitude and serving to energize the differential winding of the moving coil instrument 32. Since, as pointed out above the rectified pulses at the output of the amplifier 35 represent the difference between the systolic and diastolic pressures, the deflection of the needle or recording pen 33 will be proportional to the diastolic pressure. Both the systolic and diastolic pressures are thus indicated and/or recorded continuously and simultaneously upon the same chart, whereby to enable a comparative analysis for diagnosing purposes.

In order to enable the recorder 32 to respond not only to relative variations of the diastolic blood pressure, that is, to enable a recording in absolute or numerical pressure values, it is necessary to adjust the transmission constant or gain of the electric path or channel between the pickup 34 and the instrument 32, in such a manner that the pointer or pen 33 indicates the diastolic blood pressure in numerical scale units corresponding to the calibration of the instrument.

This calibration may be carried out by the use of any of the known methods of blood pressure measurement. Thus, for instance, the diastolic blood pressure may be determined by means of a conventional sphygmomanometer or pressure cuff applied to the other arm of the patient, whereupon the gain of the amplifier 35 is so adjusted as to cause the pointer or pen 33 to correspond with the measured value of the diastolic pressure. Detailed analysis has shown that the indication by the instrument will then automatically follow the instantaneous diastolic value with sufficient practical accuracy, provided that no change is made in the adjustment and position of the various parts, in particular the pickup devices 10 and 34.

The determination of the diastolic value for the purpose of calibrating the indicator or recorder in the manner described, is often inconvenient and cumbersome, requiring a separate blood pressure cuff, stethoscope, etc. According to an improved feature of the invention, the arrangement shown may be modified to serve as a means for calibration, substantially without requiring any change in the position of the pickup devices and other parts of the system. For this purpose, the output of the amplifier 22 is temporarily disconnected from the valve 21 by opening a switch 36 and applied to an amplitude indicator 37. The latter may be a separate instrument or the instrument 32 of the recorder may be used for this purpose. The air in the pressure cuff 11 is then controlled manually by either providing the valve 21 with an additional manual adjustment or by a separate valve in the line 15, in such a manner as to cause the cuff to be inflated or the air pressure increased from a relatively low value to a value sufficiently above the systolic blood pressure, whereupon the cuff is deflated or the air allowed to escape gradually and uniformly during a definite period, say about thirty seconds. During this period the pointer of the indicator 37 will at first be at rest, while the cuff pressure is gradually decreased. A slight initial deflection of the pointer indicates that the pressure in the cuff equals the systolic blood pressure of the patient. As the air pressure decreases further, the deflecting amplitudes of the pointer increase gradually until the air pressure equals the diastolic blood pressure. From then on the deflections or amplitudes of the pointer remain substantially constant with further deflation of the cuff. The determination of the diastolic pressure may also be made in the reverse direction by gradually inflating the cuff 11 or increasing the air pressure in the bag 14, resulting in a gradual increase of the pointer deflections to a maximum at the instant of reaching the diastolic pressure and subsequent decrease of the deflections as the air pressure is further increased. By observing the maximum deflection of the indicator 37, the numerical value of the diastolic pressure can be determined by observing the position of the needle or stylus 26.

In the arrangement described, the systolic blood pressure is continuously indicated or recorded by an automatic control of the pressure in the cuff 11 or bag 14 by the pulse waves derived from the distally arranged pickup 10, while the diastolic pressure is determined indirectly by differentially combining the systolic pressure with the average or mean pulse amplitude.

According to an alternative method, the same system may be designed to indicate or record the diastolic pressure by the automatic system and to compute or record the systolic pressure indirectly by the formation of the sum of two magnitudes or currents proportional to the systolic pressure and to the average pulse amplitude, respectively.

In the realization of a system of the latter type, the pulse pickup or microphone 10 is arranged closely adjacent to or beneath the cuff 11 so as to be substantially non-responsive to the pulse amplitude variations due to systolic pressure changes, but enabling a pickup of the arterial noise or Korotkoff sounds observed as the cuff pressure passes through a range between the systolic and diastolic blood pressure, or vice versa. These arterial sounds are amplified and rectified by the amplifier 22 to produce a current energizing the adjustable valve 21. In operation, as the cuff pressure rises gradually, the amplified arterial noise upon reaching the diastolic blood pressure, results in a closing of the valve 21, whereby to cause the air pressure in the cuff 11 to automatically balance the diastolic blood pressure by the action of valve 21, in substantially the same manner as described in balancing the systolic pressure by the pulse waves. As a result, in this case the instrument 25 or pen 26 automatically indicates or records the diastolic blood pressure. The latter is converted into a corresponding electrical current by the transducer 30 in the same manner as described hereinbefore, said surrent serving to energize one of the windings of the indicator 32. At the same time an additional energizing current, proportional to the average pulse amplitude, is applied to the instrument 32 from the amplifier 35 with this difference, however, compared with the previous arrangement, that the two energizing currents applied to the instrument are additive in their effect upon the pointer or pen 33 to indicate and/or record the systolic pressure being equal to the sum of the diastolic pressure and the average pulse amplitude. Calibration for the systolic pressure indication may again be carried out in the same manner as previously described.

The pickups 10 and 34 may be of any suitable construction known in the art, but preferably are in the form of a loosely wound electric capacitor, as described in detail in the above-mentioned patent. A capacitative microphone or pressure transducer of this type has the advantage, aside from its high response sensitivity, of a rugged and compact construction and, furthermore, that it can be made of small size for direct application to the thumb or fingers. Furthermore, the electrostatic type of pickup, such as described by the copending application, is especially suited for the purpose of the present invention by reason of the fact that the steady supporting pressure or fitting of the pickup can be determined by a simple capacity measurement without touching the pickup or its support.

In the example described, the formation of the sum or difference of the energizing currents applied to the instrument 32 is effected by the use of separate exciting windings of a moving coil or equivalent electrical instrument. Alternatively, the formation of the sum and difference of the two currents or potentials may be carried out in various other manners suggesting themselves to those skilled in the art, such as by applying the potentials to separate control grids of an amplifier tube in proper polarity relation, to produce an output current equal to the sum of difference of the input potentials. This output current may then serve to energize a conventional indicator or recorder taking the place of the instrument 32.

The automatic control by the elements 10, 11, 15, 21 and 22 has a certain time constant or time delay in following the variations of the blood pressure. The smaller the time constant the greater will be the individual pulses or heartbeats being registered which results in a certain unsteadiness of the blood pressure indication or record. In order to overcome this difficulty the device is advantageously provided with means for adjusting the all-over time constant within certain limits. This may be effected by a pneumatic damping device for the valve 21 or by varying the opening of the nozzle 23. Alternatively, a variation of the time constant may be effected purely electrically by the provision of adjustable filters or smoothing capacitors between the amplifier 35 and the instrument 32.

In the embodiment of the invention according to Fig. 1, the combination of the blood pressure, that is, either the systolic or diastolic pressure with the pulse amplitude, is carried out in a purely electrical manner by differentially or additively combining two currents or potentials in an indicating or recording device such as a differential meter or recorder, as shown in the drawing. According to a simplified method and arrangement, as shown by Figs. 3 and 4, the blood pressure and pulse amplitude are combined visually by a composite indicator, in such a manner as to enable a direct indication of both the systolic and diastolic pressure by a single observation. An arrangement of this type has the advantage, among others, of avoiding special transducers for converting pneumatic pressure into changes of electric current or potential.

In Fig. 3 the systolic pressure is indicated continuously by an automatic compensating device similar to that according to Fig. 1 and comprising a pressure cuff 11 applied, in the example shown, to the lower arm and a distally arranged electrostatic pulse pickup 10 which may be applied to the wrist or radial artery, as shown in the drawing. The pickup 10 is connected to a direct current voltage source such as a battery 40 in series with a resistor 41, whereby to cause voltage drop variations across said resistor in accordance with the capacity variations of the pickup, that is, in turn, in accordance with the pulsatile or arterial volume changes of the patient. The potential variations across the resistor 41 are impressed by way of a blocking capacitor 42 and adjustable potentiometer resistance 44 upon the control grid of a triode 45 forming part of the amplifier 35. The amplified pulse voltage across the output or load resistance 46 of the amplifier is, in turn, impressed, by way of a coupling capacitor 47, to a rectifier circuit comprising a load resistor 48, diode rectifier 50 and the control winding of an electromechanical relay 51. The latter controls the input of a further relay stage 53 energized by a local battery 52. Relay 53 serves to control a suitable power source 54, such as a house lighting circuit, to start and stop a motor 55 at the rhythm of the amplified pulse voltages. Motor 55 drives a pump or compressor 56 connected through tubing or line 57 by way of valve 58 to the tubing 15 connecting the cuff 11 with a pneumatic indicator or pressure gauge of suitable design. The motor 55 and compressor 56 are of such a design as to effect a substantially instantaneous rise from zero to maximum speed during each or preferably every second or third output pulse of the amplifier 35. As a result, the pressure in the cuff 11 increases automatically to a point to balance or compensate the systolic blood pressure and follows any blood pressure changes as a result of the action of the escape valve or nozzle 23, in the manner described in detail hereinabove. The pressure gauge which may be of any suitable design, accordingly indicates the systolic blood pressure of the patient. The gauge or indicator comprises, in place of an indicating needle or pointer, a rotating disc 60 having applied thereto a pressure scale embracing, for instance, a range from zero to 200 mm./Hg, as shown in the drawing. The scale on the indicator disc 60 cooperates with a fixed index mark 61 coinciding with the zero point of the scale in the normal or deflated condition of the cuff 11, as shown in Fig. 3. As the cuff pressure rises and finally assumes a value equal to the systolic blood pressure, the scale disc 60 rotates counterclockwise in the direction of the arrow, as shown in the drawing, thus indicating the systolic pressure opposite to the index mark 61. Thus, referring to Fig. 4, the disc 60 is shown in a position corresponding to a cuff pressure of 190 mm./Hg. In order to obtain a steady indication, the amplifier 35 and/or the pneumatic system may be provided with suitable inertia devices, such as electrical filters or a pneumatic buffer space inserted in the tubing 15 or the like, to steady the pointer fluctuations above and below the systolic blood pressure and to insure positive and easy reading.

In order to simultaneously indicate the diastolic pressure, according to the present invention, there is provided a second indicator such as an electrical instrument as shown in the example illustrated and excited by an electric current varying with and in proportion to the average pulse amplitude of the patient. For this purpose the proximally arranged electrostatic pickup or microphone 34 which, in the example shown, may be applied to the brachial artery, is connected to an operating battery 66 in series with the resistor 65 to produce voltage variations in accordance with the pulse beats or arterial volume changes, independently of the occlusion or circulation control by the pressure cuff 11 which may be of the type as shown in Fig. 2. The potential changes across the resistor 65 are applied, by way of a blocking capacitor 67 and adjustable potentiometer resistance 68, to the grid of a triode 70 forming a part of the pulse amplifier 22. The amplified output voltages developed by the load resistor 71 in the plate circuit of the amplifier are in turn applied, by way of a coupling capacitor 72, to a rectifier circuit comprising a load resistor 73, diode rectifier 74 and the exciting winding of an electrical instrument or indicator 75. The latter has a pointer 76 which projects beyond the periphery of the disc 60 of the pneumatic indicator and in its normal or zero position coincides with the index or zero mark 61, as shown at 77 in Fig. 3. As a result, the pointer 76 of the instrument 75 is deflected periodically at the rhythm of the amplified pulse voltages supplied by the output of the amplifier 22. The effect of the rectifier 74 is to limit the deflection to a single direction, the latter being so chosen, by proper polarity connection with the meter terminals, that the end 77 of pointer 76 moves in a direction towards decreasing pressure values of the scale on the disc 60. If desirable, the amplifier 22 may be designed to have a time constant with or without a large capacitor being shunted across the meter 75 in an effort to steady the indication of the pulse amplitude, in a manner readily understood.

As a result of this construction of the composite indicator responsive to the systolic blood pressure and pulse amplitude, respectively, the systolic pressure will be automatically indicated by the scale number of the disc 60 being opposite to the index 61, while the diastolic pressure will be indicated by the number of the same scale opposite to the end 77 of the pointer 76, the latter indication constituting the difference between the two pressures. Thus, referring to Fig. 4, the disc 60 is shown deflected or rotated to indicate a systolic pressure of 190 mm./Hg, while the deflection $\alpha$ of the pointer 76 representing the pulse amplitude results in a difference indication or diastolic pressure equal to 100 mm./Hg, in the example illustrated. While the systolic pressure will be continuously indicated by the automatic compensating system, correct numerical indication of the diastolic pressure requires a proper calibration, whereupon both pressures will be automatically and continuously indicated by the composite meter in the manner described. In order to calibrate the indication of the pulse amplitude, the diastolic pressure may be determined separately, such as by means of a known sphygmomanometric method, whereupon the potentiometer 68 of the amplifier 22 is adjusted to a point where the end of the pointer 77 is opposite to the scale number on the disc 60 corresponding to the diastolic blood pressure obtained from the separate measurement.

According to an alternative arrangement for visually combining the systolic blood pressure and pulse amplitude, diagrammatically shown in Fig. 5, the meter 79 indicating the pulse amplitude is mounted upon or carried by the meter 78 indicating the systolic blood pressure and connected to the output of the automatic compensating system. In the zero position, as shown in Fig. 5, the pointer 78' of the meter 78 coincides with the position of the pointer 79' of the meter 79, both meters furthermore being so arranged or connected that pointer 78' is deflected in the direction of increasing pressure on the scale 60', while pointer 79' is deflected in the direction of decreasing pressure, as indicated by the arrows $a_1$, $a_2$, respectively, in the drawing.

If now the meter 78 is deflected to indicate the systolic pressure and the meter 79 is deflected to indicate the pulse amplitude, as shown in Fig. 6, it is seen that the latter again indicates the difference of the two pressures, that is, the diastolic blood pressure in a manner substantially similar to Fig. 3. In other words, deflection of the meter 78 indicates a systolic pressure, that is, 150 mm./Hg in the example illustrated, the meter 79 having been rotated by the same amount and with its deflection being in the opposite direction and proportional to the pulse amplitude, it indicates the diastolic pressure, that is, a pressure of 100 mm./Hg according to the example illustrated.

In an arrangement according to Fig. 5, meters 78 and 79 may be of any suitable type, that is, pneumatic or electrical, the combined indication being purely visual and independent of the design or construction of the meters.

In the previous embodiments of the invention two meters or indicators are utilized, to indicate the systolic and diastolic blood pressures, respectively. According to an alternative method and system, as shown in Figs. 7 to 9, there is used a single indicator operated or being excited intermittently in such a manner as to alternately indicate the systolic and diastolic pressures for either indication and/or recording of the pressures, respectively.

Referring to Fig. 7, the automatic compensator to indicate the systolic pressure is substantially the same as in Fig. 3 and comprises the pressure cuff 11, distally arranged pulse pickup 10, amplifier rectifier 35, relay 53, power source 54 and pump motor or compressor 80. The tubing 15 connects the cuff 11 with the pressure gauge or indicator 82 by way of a pressure chamber or space 81 and tubing 83. Mounted within the space 81 is an expansible bellows 84 or aneroid member fixedly supported at its lower end as at 85 and carrying a magnetic plunger 86 at its upper end cooperating with a solenoid winding 87. The bellows 84 has a lower tubular extension 88 communicating with the tubing 83 and having attached thereto a rubber tube or the like 90 forming a control valve and communicating with the space 81. The valve further comprises a solenoid winding 91, a plunger having a rear portion 92 of magnetic material and a front portion of non-magnetic material 93, said plunger arranged to move within said solenoid against the action of a balancing or restraining spring 94. The plunger 92, 93 upon being drawn into the solenoid winding, compresses the end of the tube or valve member 90 against a stop or abutment 95. Both solenoid windings 87 and 91 are connected to the output of the pulse amplifier 22 either in parallel or in series, as shown, a rectifier 96 serving to produce unilateral pulses for exciting the solenoid windings. The input of amplifier 22 is controlled by the proximally positioned pulse pickup 34, in substantially the same manner as in the preceding embodiments.

The operation of Fig. 7 is as follows: Assuming for the time being the absence or disconnection of the pickup 34, the pressure in the cuff 11, tubing 15, chamber 81, rubber tube 90, bellows 84, tubing 83 and gauge 82, will be adjusted by the automatic feedback or compensation control to a value equal to the diastolic blood pressure, in the same manner as described hereinabove. If now the pickup 34 is connected, the amplified pulse voltages supplied by the output of the amplifier 22 effect a periodic expansion of the bellows 84 and simultaneous closing of the valve tube 90. As a result, during each pulse the air supply is disconnected from the gauge 82 and bellows 84 by the action of the plunger 92, 93 accompanied by an expansion of the bellows and, in turn, a reduction of the pressure therein and the associated gauge 82 to a value dependent on the instantanous pulse amplitude. In other words, this reduced pressure being proportional to the pulse amplitude, manifests itself by a reduction of the pointer deflection of the gauge 82 in the direction of the arrow a, and, provided a suitable calibration, results in an indication of the diastolic pressure at the peak of the deflection or pulse amplitude indication.

Referring to Fig. 8, there is shown the effect of the rectifier 96 in limiting the pulse wave along the reference level x—x, whereby to result in unidirectional pulses within the the intervals $t_1$—$t_2$, $t_1'$—$t_2'$. If desirable, the pulse wave shape may be further modified and freed from secondary fluctuations to result in two pulses having a single ascending and descending branch by suitable filtering devices included in the amplifier 22, such as of the type as shown and described in U. S. patent application Serial No. 362,009, filed June 16, 1953, entitled, "Pulse Rate Indicator," in the name of Heinz Boucke, joint inventor of the present application, and now Patent No. 2,815,748.

There is obtained in this manner a unitary indication by means of a single instrument having a pointer fluctuating continuously between the upper and lower values corresponding to the systolic and distolic pressures, respectively. Alternatively, the pressure variations may be recorded to produce a record as shrown in Fig. 9, wherein SP represents the systolic pressure, DP represents the diastolic pressure, the recording chart being moved in the direction of the arrow b and the pointer or stylus moving in the direction of the arrow c.

Figure 11:
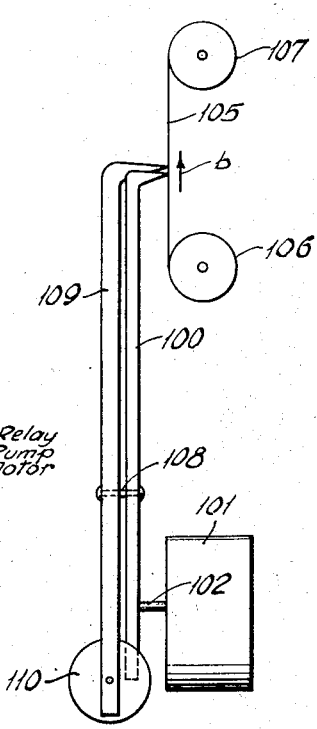

Fig. 10 is a schematic front view and Fig. 11 is a side view illustrating in greater detail another type of pneumatic twin recorder for carrying into effect the invention. The recording arm 100 of a pneumatic gauge 101 being pivoted at 102 is deflected in accordance with the pressure in the cuff 11. The cuff pressure is automatically maintained to equal the systolic blood pressure by means of a feed back system of the type described and comprising the distally arranged pulse pick-up 10 and amplifier 35 followed by a relay and pressure control device of substantially the same type as shown in the preceeding views. As a result, point 104 of the recording stylus 100 traces a curve s upon the continuously moving recording surface 105, such as a paper strip being unwound from a supply roll 106 unto a take-up roll 107, in the direction of the arrow b. In the example illustrated, the stylus 100 is deflected in the direction of arrow d with increasing pneumatic pressure applied to the gauge 101.

Pivotally mounted at an intermediate point 108 of the stylus 100 is a further recording stylus 109 of substantially lesser weight and mass whose lower lever arm is attached to one end 111 of an expansible chamber, such as a bellows 110 having its opposite end 112 connected, such as by means of a connecting rod 115 or the like, to the end 114 of a lever arm 113 of the stylus 100 extending below the pivot 102. The bellows 110 is connected through a flexible tubing 116 to a further stationary bellows or equivalent expansible member 117 which serves to convert the electric pulse variations produced by the proximally arranged pulse pick-up 34 into proportionate pneumatic pressure changes for deflecting the stylus 109 and recording of the pulsatile variations p by the pen or point 115 of the stylus 109, simultaneously with the recording of the systolic blood pressure by the stylus 100. Bellows 117 is shown actuated for this purpose by the magnetic plunger 118 of a solenoid winding 120 energized by the output of the pulse amplifier 22 and rectifier 96, the latter serving to provide unilateral pulses, as described with reference to Fig. 8. The filter capacitor 121 serves to smoothen the control pulses energizing the solenoid 120.

The design of both indicators or recorders and the adjustment of the points 104 and 115 are such that, normally, that is with no pulses being applied by the bellows 110, both recording points coincide as closely as possible, in such a manner that point 115 will be deflected from point 104 of the stylus 100 as a starting point in accordance with the pulse amplitudes in the direction of arrow g, that is, opposite to the deflection of point 104 to result in a record p, as shown in the drawing.

Accordingly, the stylus 100 continuously records the systolic blood pressure in the manner pointed out and as represented by the line s or lower enveloping curve of the pulsations p, while the upper enveloping curve r of the pulse amplitudes represents the diostolic pressure, providing a proper calibration of both indicators.

According to a simplified construction of a twin indicator and/or recorder of this type, the upper arm of the stylus 100 and the recording point 104 may be omitted. In this case only the pulse curve p will be recorded the lower and upper enveloping curves s and r of which represent the systolic and diostolic blood pressure, respectively, in a manner readily understood from the above.

In the foregoing the invention has been described with reference to a few illustrative devices. It will be evident, however, that numerous changes and variations, as well as the substitution of equivalent parts and elements for those shown for illustration, may be made without departing from the broader scope and spirit of the invention as set forth in the appended claims. The specification and drawing are accordingly to be regarded in an illustrative rather than in a limiting sense.

What is claimed is:

1. A system for simultaneously indicating and/or recording the systolic and diastolic blood pressures of a human or animal organism comprising a pressure cuff to occlude the blood supply through an extremity, a source of compressed fluid connected to said cuff to inflate the same, a first distally arranged pulse pickup and amplifier connected thereto to produce a pulse wave current subject to occlusion by said cuff, valve means between said source and cuff controlled by said pulse wave current, to maintain the cuff pressure at a value to substantially balance the systolic blood pressure, a first indicator responsive to the cuff pressure to indicate the systolic blood pressure, a second proximally arranged pulse pickup and amplifier-rectifier connected thereto to produce a unidirectional pulse current independently of said cuff, and differential indicating means controlled by said systolic blood pressure and said pulse current, respectively, to produce a resultant indication proportional to the diastolic blood pressure.

2. A system as claimed in claim 1, wherein said last means is comprised of a differential electrical instrument, means to produce an electric current proportional to the cuff pressure, and further means to excite said instrument by said last current and by the output current of said amplifier-rectifier, respectively.

3. A system as claimed in claim 1, wherein said first indicator comprises a movable disc having a scale calibrated in pressure units and cooperating with a fixed index mark and wherein said differential indicating means comprises a further indicator having a pointer and energized by the output of said second amplifier, said second indicator mounted behind said first indicator with said disc and pointer moving substantially concentrically and with the end of said pointer protruding beyond the periphery of said disc, and said second indicator arranged with said pointer coinciding with said index mark in the zero position and movable in the direction of decreasing pressure on said scale.

4. In a system as claimed in claim 1, wherein said first indicator has a pointer cooperating with a fixed scale calibrated in pressure units and said differential indicating means is comprised of a further indicator energized by said second amplifier and fixedly mounted upon said first indicator substantially concentrically therewith, said further indicator having a pointer cooperating with and movable in the direction of decreasing pressure values on said scale in proportion to increasing exciting current.

5. In a system as claimed in claim 1, wherein said first indicator is comprised of a pneumatic pressure gauge having a pointer and said differential indicating means comprises an expansible pressure chamber connected to said gauge and means responsive to the output of said second amplifier to expand said chamber in proportion to the amplitude of said pulse fluctuations, thereby to cause the indication of said gauge to fluctuate at the rhythm of the pulse rate between the systolic and diastolic pressures.

6. An arterial occluding cuff for blood pressure measurment and the like comprising a supporting strap adapted for application about an extremity, a cushion secured to the inside of said strap and an inflatable member opposite to said cushion and having a projection adapted to engage and variably occlude an artery in proportion to the fluid pressure within said member.

References Cited in the file of this patent
UNITED STATES PATENTS

2,581,114     Larson                 Jan. 1, 1952